United States Patent [19]

Phillips

[11] Patent Number: 4,835,862
[45] Date of Patent: Jun. 6, 1989

[54] COAXIAL CABLE CUTTER/STRIPPER

[76] Inventor: Daniel B. Phillips, 3936 Terra Vista Way, Sacramento, Calif. 95821

[21] Appl. No.: 889,201

[22] Filed: Jul. 25, 1986

[51] Int. Cl.$^4$ ............................................. B21F 13/00
[52] U.S. Cl. .......................................... 30/90.1; 7/107; 81/9.4
[58] Field of Search ................ 30/90.1; 70/107; 81/9.4

[56] References Cited

U.S. PATENT DOCUMENTS

| | | | |
|---|---|---|---|
| 669,556 | 3/1901 | Spring | 30/91.2 |
| 1,011,157 | 12/1911 | Chytraus | 81/9.4 X |
| 2,704,000 | 3/1955 | Miller | 81/9.4 |
| 3,878,606 | 4/1975 | Hug | 30/90.1 |
| 4,526,068 | 7/1985 | Undin et al. | 30/90.1 |

*Primary Examiner*—Frank T. Yost
*Assistant Examiner*—Willmon Fridie, Jr.

[57] ABSTRACT

A hand tool including a pair of jaws for being brought together, one jaw having a cutting blade and the other having a block with holes therethrough for receiving a coaxial cable for being stripped and cut.

3 Claims, 1 Drawing Sheet

COAXIAL CABLE CUTTER/STRIPPER

BACKGROUND OF THE INVENTION

1. Field of the Invention

This invention relates generally to hand tools employed for cutting and stripping coaxial cables.

2. Description of Prior Art

It is well known that cutter/strippers have been developed in the past for use on coaxial cables, however, none are ideal for producing perfect results when a coaxial cable is wished to be cut to precise length and wherein a cut is made squarely without distortion.

SUMMARY OF THE INVENTION

Accordingly, it is a principal object of the present invention to provide a coaxial cable cutter/stripper which will hand cut a coaxial cable squarely without distortion; the cut lengths being possible to be made as short as one-sixteenth of an inch; the tool being able to trim the outer sheath to an exact length, trim the braid to a correct length when it is combed out, and cut the center dielectric to within one-sixteenth of an inch, facilitating easy trimming with a knife.

Another object is to provide a coaxial cable cutter/stripper which incorporates a method to easily straighten the center conductor if it becomes distorted.

Yet another object is to provide a coaxial cable cutter/stripper which will be useful as a soldering aid during connector assembly, and it will hold either the cable or the pin during soldering.

Yet a further object is to provide a coaxial cable cutter/stripper which is quick and easy to operate, and will reduce amount of cable that is wasted.

Yet a further object is to provide a coaxial cable cutter/stripper wherein built-in gauges allow exact dimensional cutting of a cable for proper installation of a connector thereon, without need of a small ruler and scissors. It eliminates the likelihood of "nicking" the braid and or center conductor and therefore, provides a stronger connection mechanically and electrically.

These and other objects will be readily evident upon a further study of the following Specification and the accompanying Drawing.

DETAILED DESCRIPTION

Figure 1:
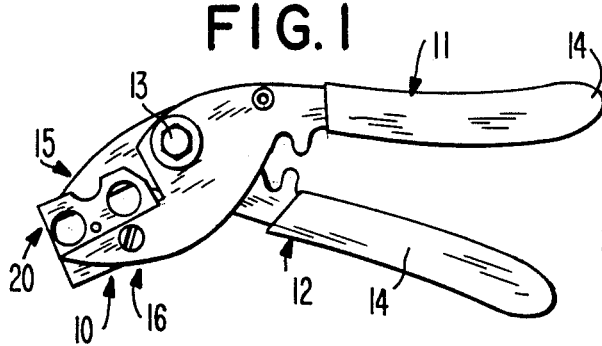
FIG. 1 is a side elevational view, in the closed position, of a coaxial cable cutter/stripper, shown in accordance with the present invention.
Figure 2:
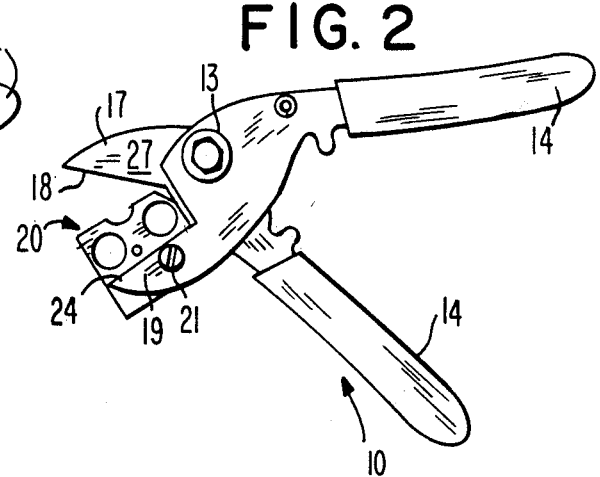
FIG. 2 is a side elevational view in the open position of the embodiment of FIG. 1.
Figure 3:
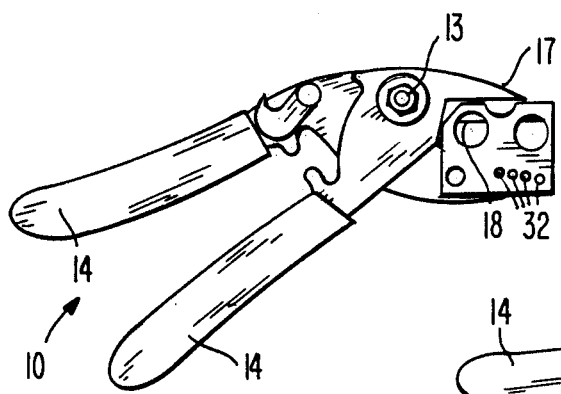
FIG. 3 is a side elevational view of the opposite side not seen in FIGS. 1 and 2, in the closed position.
Figure 4:
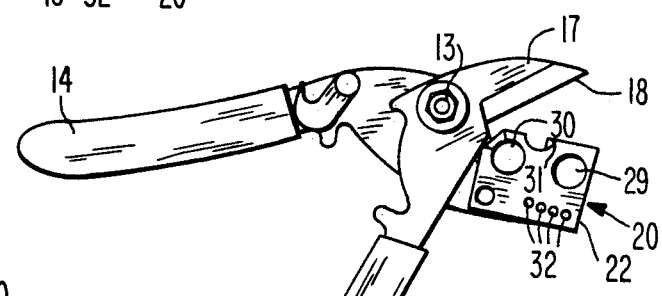
FIG. 4 is a side elevational view in the open position of FIG. 3.
Figure 5:
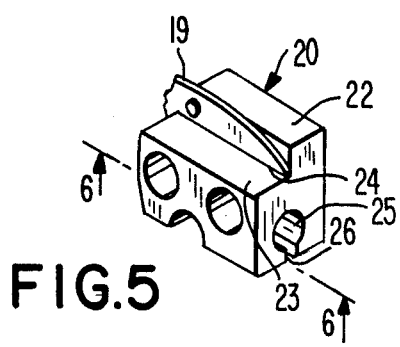
FIG. 5 is a fragmentary perspective view of the cutter/stripper head.
Figure 6:
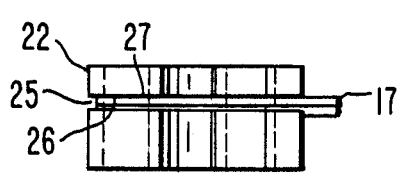
FIG. 6 is a view taken along line 6—6 of FIG. 5.
Figure 7:
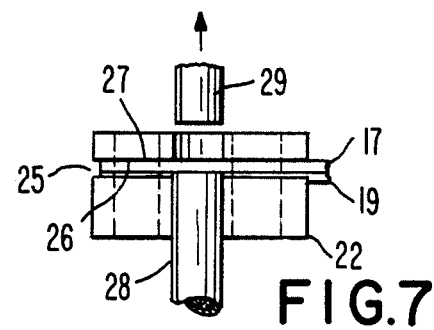
FIG. 7 is a view similar to FIG. 6, showing a cable being cut.

Referring now to the Drawing in greater detail, the reference numeral 10 represents a coaxial cable cutter/stripper according to the present invention wherein there are a pair of crossing levers 11 and 12 pivotally attached together by means of longitudinally intermediate portions thereof being mounted on a pivot screw 13.

One end of each lever serves as a handle 14 for being squeezed together in a person's hand in order to close together a pair of cooperative jaws 15 and 16 formed on the opposite ends of the two levers.

One of the jaws comprises a flat blade 17 having a sharpened straight edge 18.

The other jaw comprises a flat blade-like base 19 on which a cutter/stripper head 20 is rigidly affixed by means of a single screw fastener 21; the head 20 comprising a block 22 having a notch 23 against a face of which a straight edge 24 of the base is abutted. A notch 25 across the block admits the cutting blade to enter an enlarged rounded inward end of the notch when the jaws are closed together. A face 26 of the notch 25 aligns with a flat side 27 of the entering blade 17 for cutting a coaxial cable 28. As shown, the block includes transverse outer hole 29, inner hole 30 and a "half" hole 31. Graduated holes 32 are provided for or straightening a center conductor of the cable. The prototype tool is specialized to RG-214 coaxial cable and UG 1185 or UG 1186 Type N connectors. However, the same cutting/trimming principle can be applied to nearly all other sizes of cable also.

The cutting action should start 0.312 inches from the "right" side of the aluminum block. This measurement is the length of outer jacket that is to be trimmed from RG-214 cable before attaching a Type N connector.

The "half hole" 31 across the top of the aluminum block is used to cradle the cable, preventing distortion as the cable is cut completely through. A "half hole" seems to work as well as a complete hole.

The outer hole 29 was so positioned, that when the blade is completely closed, it would penetrate into the cable the exact depth required to cut the outer jacket of the cable, deep enough to be easily removed after the cut, but not deep enough to cut the braid.

With the blade open, the cut off cable is inserted into the left side of the outer hole until the end of the cable is even with the right side of the block. The blade is closed and either the cable or the tool is rotated completely around, deeply scoring the outer jacket 0.312 inches from the end of the cable.

The inner hole 30 is so positioned, that when the blade is completely closed it would penetrate into the hole the exact depth required to cut the cable to the depth of the center conductor, but without cutting it. This cut is to be made 0.187 inches from the end of the cable. A window was cut into the wall of the inner hole 30 enabling one to see the cable has been inserted 0.187 inches past the blade.

In operative use, with the blade open, the cable is inserted into the left side of the inner hole until the end of the cable is visible in the window, on the right side of the block. The blade is closed and either the cable or the tool is rotated completely around, cutting through the jacket, braid and dielectric to the depth of the center conductor, completely around the cable.

This cut will cause 0.187 inches of outer jacket and braid to fall off, exposing the center dielectric. The dielectric cannot be easily removed on RG-214 cable because it is molded onto the center conductor.

To facilitate the removal of the exposed dielectric, a 0.312 inch hole, the same size as the diameter of the dielectric, was provided in the end of the block. The hole is positioned so that when the dielectric is inserted into it, the tip of the blade can cut the 0.187 inches of exposed dielectric to the depth of the center conductor.

Then, insert the exposed dielectric into the front hole, close the blade to complete the cut. The insertion cannot be too deep because the remaining 0.125 inches of outer jacket is still in place to prevent it. Open the blade, rotate the cable approximately 50 degrees and cut again. Four to six cuts will be enough to easily peel away segments of the dielectric.

The remaining 0.125 inches of outer jacket can be easily removed. The exposed braid will be the correct length when combed out and folded back over the braid clamp. The flat washer from the connector is put over the newly exposed dielectric against the braid. Using a knife, cut the extra dielectric that is exposed beyond the washer, being careful not to nick the center conductor. Next, put on the insulator and put the center pin on the center conductor, the penetration will be the proper depth. The pin is soldered and the remainder of the connector is put together.

A series of holes, the smallest being the same size as the center conductor was drilled into the side of the block. The sizes are graduated and used to reshape the center conductor to the correct size if it gets distorted.

As a soldering aid, the two handles in conjunction with a cable in the half hole will form a tripod solid enough to hold the cable during soldering.

While various changes may be made in the detail construction, it is understood that such changes will be within the spirit and scope of the present invention, as is defined by the appended claims.

What I now claim is:

1. A combination coaxial cable cutter/stripper capable of precision cutting of a coaxial cable, comprising crossing levers pivotally attached together, a handle at one end of each said lever, a cutting blade with one flat side on the other end of one lever, a block with a cradle sized to the coaxial cable being cut and positioned at right angles, from the flat side of the cutting blade is affixed to the end of the other lever, the block also has a notch the length of the block shaped and sized the same as the cutting blade, permitting the blade to enter the block when the blade is closed, the combination of the cradle and flat side of the cutting blade produce near perfect longitudinally cuts maintaining the coaxial cables round shape and nominal impedance; said block also includes two transverse holes for selectively receiving a coaxial cable, the holes are so positioned in the block that when the blade is fully closed it will penetrate into each of these holes a predetermined depth, the width of the block is used as a gauge for determining the exact distance from the end of the cable to start the stripping sequence, the other hole incorporates a window cut thru the wall of the hole to view when the cable has been inserted deep enough to locate the second cut required in the stripping process.

2. The combination as set forth in claim 1 wherein said block includes a hole the size of the dielectric in the end of the block that allows longitudinal cuts to be made in the dielectric a predetermined length and depth to ease the removal of the dielectric, molded to the center conductor during the cable manufacturing process.

3. The combination as set forth in claim 1 wherein said block includes a series of holes, the smallest hole being the same diameter as the diameter of the center conductor of the coaxial cable being serviced, the larger holes are graduated in size and used to reshape, resize, or straighten a center conductor to make it fit into the center pin of a coaxial connector if necessary.

* * * * *